Sept. 9, 1952 R. P. STEADMAN 2,609,763
DEVICE FOR REMOVING MISALIGNED OR MISSHAPEN
DOUGH SHEETS FROM CONVEYERS
Filed April 19, 1949 2 SHEETS—SHEET 1

INVENTOR.
Rufus P. Steadman,
BY
Harness, Dickey & Pierce
ATTORNEYS.

Sept. 9, 1952 R. P. STEADMAN 2,609,763
DEVICE FOR REMOVING MISALIGNED OR MISSHAPEN
DOUGH SHEETS FROM CONVEYERS
Filed April 19, 1949 2 SHEETS—SHEET 2

INVENTOR.
Rufus P. Steadman.
BY
Harness, Dickey & Pierce.
ATTORNEYS.

Patented Sept. 9, 1952

2,609,763

UNITED STATES PATENT OFFICE 2,609,763

DEVICE FOR REMOVING MISALIGNED OR MISSHAPEN DOUGH SHEETS FROM CONVEYERS

Rufus P. Steadman, Saginaw, Mich., assignor to Baker Perkins Inc., Saginaw, Mich., a corporation of New York Application April 19, 1949, Serial No. 88,324

5 Claims. (Cl. 107—7)

This invention relates broadly to bakery products and more particularly to a device for removing misshapen or misaligned dough pieces from loaf-molding machines before such pieces pass through the coiling and molding mechanisms with which such machines are conventionally equipped.

In the baking of bread on a commercial scale, dough pieces of proper size are formed in any suitable manner and delivered to a suitable loaf-molding machine which automatically coils them into loaf form and then seals the loaves by application of appropriate pressure. All of these operations are performed automatically. A conventional loaf-molding machine of the type referred to above is shown in the Burdett et al. Patent No. 2,373,012. Conventional mechanism for delivering sheeted dough pieces to the loaf-molding machine is shown in the Engels Patent No. 2,391,691.

Loaf-molding machines of the type shown in the Burdett et al. patent are equipped with a conveyor which carries the dough pieces through the coiling and pressing mechanisms, and it is important that the pieces be delivered one at a time substantially exactly centrally on the conveyor. Trouble results if the dough pieces are not delivered one at a time or if they are improperly placed on the conveyor. For example, it sometimes happens that a dough piece sticks momentarily to the rollers or flipper of the delivery mechanism. When this occurs, the dough piece does not fall centrally but at one side or the other of the conveyor. These misaligned dough pieces do not properly engage the coiling mechanism and the result is an odd-shaped or misshapen loaf. In addition to the above, it sometimes happens that two dough pieces stick together, forming a "double" which, because of its weight, is not delivered centrally of the conveyor. If a double is permitted to pass through the coiling and molding mechanism, the skin sometimes ruptures and the soft sticky interior is smeared over the machine, causing delays for cleaning.

An important object of the present invention is to provide means for automatically removing misshapen or misaligned dough pieces from the conveyor before the same are delivered to the coiling and molding mechanism.

Another object of the invention is to provide a device of the above-mentioned character that collects dough pieces removed from the conveyor and accumulates them for appropriate disposition.

Other objects and advantages of the invention will be apparent during the course of the following description.

In the drawings forming a part of this specification and wherein like numerals are employed to designate like parts throughout the same:

Considered broadly, the present invention comprises one of more movable devices located at one or both sides of the conveyor of a dough-molding machine and which are operative to pick up any dough pieces which extend laterally toward one or both side edges of the conveyor beyond a desired central position. In the form illustrated, the devices are drums driven in a direction opposite to the conveyor and at a relatively higher rate of speed to facilitate removal of the dough pieces, and any pieces removed from the conveyor are collected in a suitable container for appropriate disposal.

Figure 1:
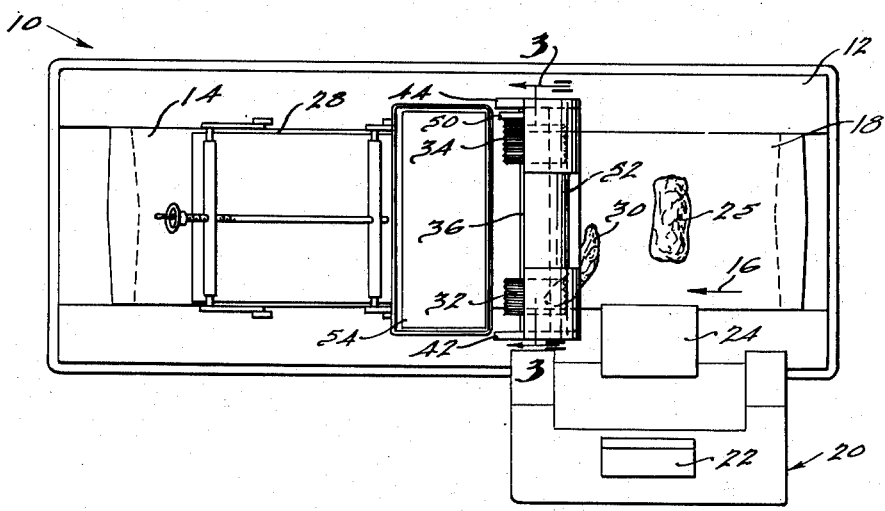
Figure 1 is a top plan view of a loaf-molding machine having associated therewith a conventional mechanism for delivering dough pieces thereto and a device embodying the present invention for removing misaligned or misshapen dough pieces therefrom.
Figure 2:
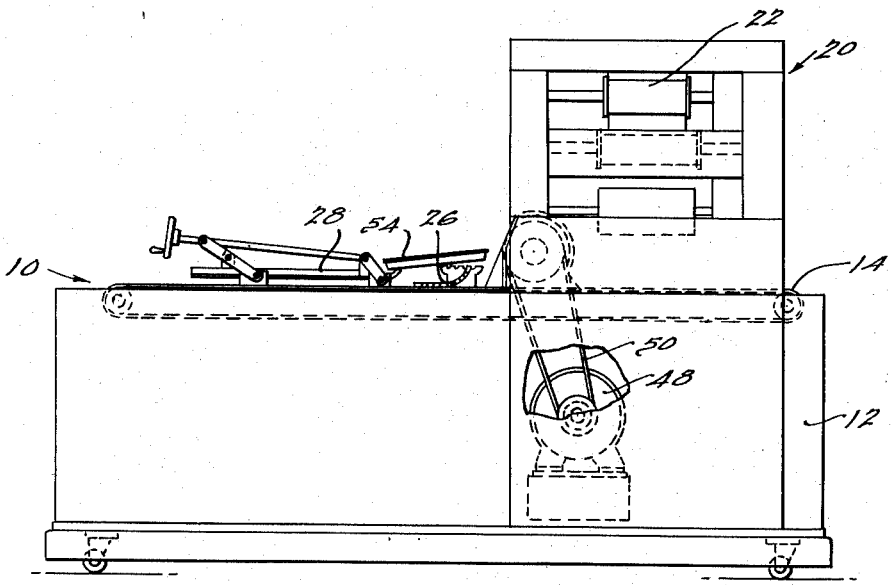
Figure 2 is a side-elevational view thereof.

For a detailed description of the invention, attention is directed to the accompanying drawings wherein the numeral 10 designates a conventional molding machine of the type shown in the Burdett et al. patent hereinabove referred to. This machine has an elongated base 12, and a horizontally-disposed endless conveyor 14 extends medianly along the top surface of the base. Suitable means (not shown) are provided for driving the conveyor 14 in the direction of the arrow 16 (Figure 1).

Preformed dough pieces are delivered, one at a time, to the receiving end 18 of conveyor 14 by a conventional mechanism 20. For purpose of illustration, the delivery mechanism of the Engels patent referred to above is here shown. In the patented device, prepared dough pieces are charged between rollers 22 to an endless belt or "flipper" 24 which throws them so that they land flatly and substantially centrally on the conveyor 14, as indicated at 25 in Figure 1. The conveyor then carries the dough pieces through a coiling mechanism 26, where they are rolled into generally cylindrical loaves, and then through a molding device 28 which seals the loaves.

It sometimes happens that a dough piece is not delivered properly to the conveyor, and, as suggested, this usually is caused by a dough piece sticking to the flipper 24 or by two dough pieces sticking together. When this occurs, the dough piece falls short of the centerline of conveyor 14. A typical situation of this character is shown at 30 in Figure 1. The dough piece 30 is not aligned properly with the coiling mechanism 26 and molding device 28 and will produce a misshapen loaf. On the other hand, if the misaligned dough piece is a "double," it will not only produce a misshapen loaf but there is danger that the outer skin will rupture and the soft sticky interior will be smeared on the machine.

Figure 5:
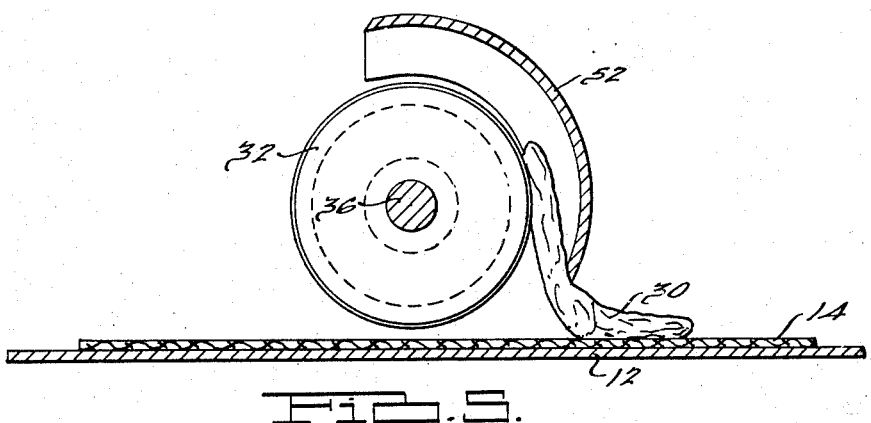
Figure 5 is a vertical, longitudinal, sectional view taken on the line 5—5 of Figure 3.

In order to pick up or remove from the conveyor 14 misaligned dough pieces, i. e. dough pieces which extend beyond a predetermined amount laterally on the conveyor, a pair of rotating drums 32 and 34 is mounted above the opposite marginal edges of the conveyor. These drums 32 and 34 are carried by a shaft 36 which is arranged above and transversely across conveyor 14. Set screws 38 and 40 fasten drums 32 and 34 to shaft 36, and the terminals of the shaft are journaled for rotation in suitable bearings provided in side plates 42 and 44, which are mounted on the base 12 at opposite sides of the conveyor 14. The drum 34 carries a pulley 46, and the latter is rotatably driven by a motor 48 through an endless belt 50. A suitable pressure plate 52 covers the drums 32 and 34. The pressure plate 52 is arcuately curved and spaced radially from the peripheral surfaces of the drums 32 and 34. Although some variation in the relative positioning of the drums 32 and 34 and pressure plate 52 is permissible, the latter is here shown disposed primarily in front and above the drums and extending from a point adjacent to the conveyor 14 to a point slightly beyond a vertical line through the axis of the drums. Also, the pressure plate 52 is here shown disposed slightly eccentrically with respect to the drums 32 (Fig. 5) with the leading or lower edge thereof disposed slightly closer to the peripheral surfaces of the drums than the upper or trailing edge thereof. Also, substantial variation in the spacing between the peripheral surfaces of the drums 32 and 34 and the pressure plate 52 is permissible. If desired, the pressure plate 52 can be spaced from the drums a distance slightly less than the average thickness of the dough pieces 30 handled by the machine; however, it preferably is spaced somewhat in excess of this dimension as shown in the drawings, as this permits substantial variation in thickness between the individual dough pieces and makes the machine more nearly universal in operation. When the parts are positioned substantially as shown in Fig. 5 of the drawings, misaligned dough pieces contacting one or the other of drums 32 and 34 are picked up by the engaged drum. The dough piece is then lifted, as shown in the drawings, until the weight or drag of the dough piece causes it to fall away from the drum. When this latter contingency occurs, the dough piece falls back upon itself and against the pressure plate 52, completely filling the space between the drum and the plate. Thereafter, the drum rolls the dough piece along the inner surface of the pressure plate and discharges it over the top of the drum. If the dough piece is substantially thinner than the distance between the drum and the pressure plate, it may fall back upon itself several times before it builds up sufficient thickness to engage both the drum and the plate simultaneously. It will be apparent also that the plate 52 serves as a guard or shield for the drums 32 and 34.

Figure 3:
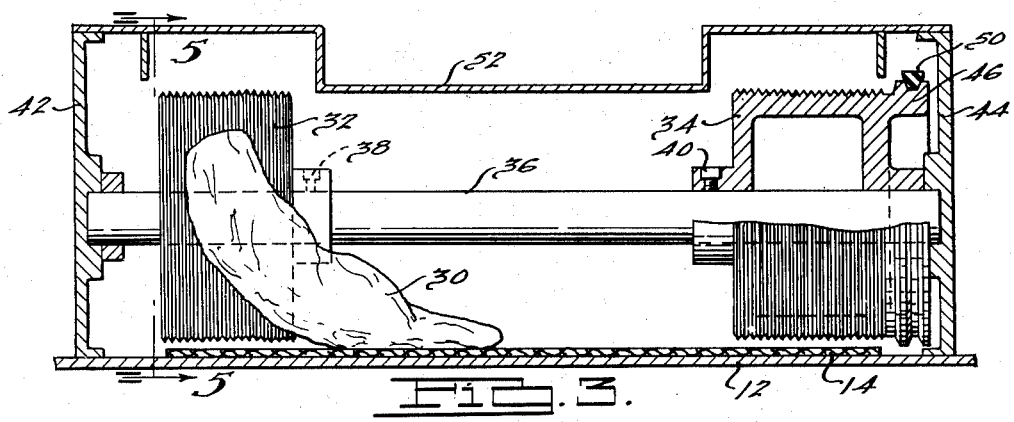
Figure 3 is an enlarged, vertical, transverse sectional view taken on the line 3—3 of Figure 1 and particularly illustrating the manner in which misaligned or misshapen dough pieces are picked up by the device and removed from the conveyor.
Figure 4:
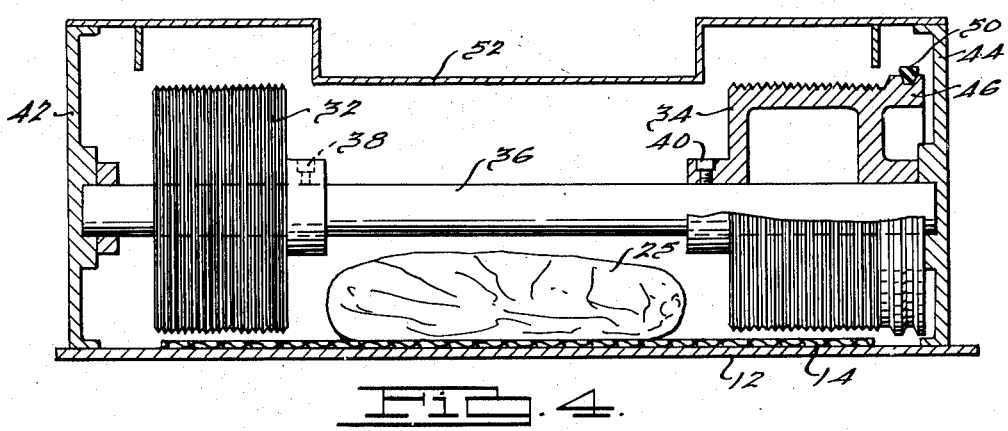
Figure 4 is a view similar to Figure 3 but showing the manner in which properly placed dough pieces pass through the device.

As indicated by arrows in the drawings, motor 48 rotatably drives the drums 32 and 34 in a direction opposite to the direction of travel of conveyor 14. Also, it will be observed that the drums 32 and 34 are mounted with the peripheral surfaces thereof spaced slightly above the conveyor 14. Thus, the peripheries of drums 32 and 34, in effect, sweep the top surface of the conveyor. Dough pieces which are properly centered on the conveyor 14 pass between drums 32 and 34 (Figure 4); however, misaligned dough pieces, such as the piece 30, engage one or the other of drums 32 and 34. When this occurs, the drums pick up the dough piece, as shown in Figures 1, 3 and 5, and remove the same from the conveyor.

If desired, the peripheries of drums 32 and 34 may be serrated or grooved, as shown in the drawings, to assure better adherence of the dough pieces to the drums. Also, the drums 32 and 34 preferably are driven considerably faster than the conveyor to improve the pick-up characteristics of the mechanism. Preferably drums 32 and 34 should be driven at a surface speed approximately twenty times the surface speed of conveyor 14 for optimum results.

Dough pieces picked up from the conveyor 14 are carried over the tops of the drums and deposited in a suitable container. Such a container is here shown in the form of a pan 54 which is disposed behind the drums and on the coiling mechanism 26. Dough pieces picked up by the drums 32 and 34 accumulate in pan 54 and are removed and suitably disposed of from time to time.

It may thus be seen that the objects of the invention are accomplished. There is provided a device that can be readily applied to a conventional dough-molding machine and that is operative to pick up automatically from the delivery conveyor of the machine any dough pieces that are not positioned for proper alignment with the forming and pressing mechanisms. The device effectively prevents production of misshapen loaves as well as shut-downs for cleaning due to rupture of misaligned or "double" dough pieces. The mechanism embodying the present invention performs its intended function automatically and exceedingly efficiently.

Having thus described the invention, what is claimed is:

1. Apparatus for removing misaligned or misshapen dough sheets from a conveyer comprising a rotatable drum arranged above a portion of the conveyer with its rotational axis substantially parallel thereto, the periphery of the drum being spaced from the conveyor by a distance less than the minimum thickness of the dough pieces handled by the apparatus so that the drum engages and picks up dough pieces on the mentioned portion of the conveyor, and an arcuately curved pressure plate spaced generally uniformly from the periphery of the drum and so located as to be engaged by the dough pieces picked up by the drum whereby the drum rolls such dough pieces along the plate for disposal.

2. Apparatus for removing misaligned or misshapen dough sheets from a conveyer comprising a pair of transversely spaced driven devices mounted above the conveyer at opposite sides thereof, each including a rotatable drum overlying a marginal portion of the conveyer and arranged with the periphery thereof spaced from the conveyer by a distance less than the minimum thickness of the dough pieces handled by the apparatus whereby the drums engage and pick up dough pieces on the mentioned portions of the conveyer, and arcuately curved pressure plates spaced generally uniformly above the peripheries of the drums, said pressure plates so located as to be engaged by the dough pieces picked up by the drums whereby the drums roll such dough pieces along the plates for disposal.

3. Apparatus for removing misaligned or misshapen dough sheets from a conveyer comprising a rotatable shaft disposed transversely above the conveyer, a pair of laterally spaced drums mounted on and rotatable with the shaft, the periphery of the drum being spaced from the conveyer by a distance less than the minimum thickness of the dough pieces handled by the apparatus so that the drums engage and pick up dough pieces carried under the drums by the conveyer, and arcuately curved pressure plates spaced generally uniformly from the peripheries of the drums and so located as to be engaged by the dough pieces picked up by the drums whereby the drums roll such dough pieces along the plates for disposal.

4. Apparatus for removing misaligned or misshapen dough sheets from a conveyer comprising comprising a rotatable shaft, means for mounting the shaft transversely above the conveyer, a pair of drums on and rotatable with the shaft, and arcuately curved pressure plates spaced generally uniformly from the peripheries of the drums, said drums being spaced sufficiently far apart on the shaft to accommodate therebetween all dough sheets properly placed on the conveyer, the peripheries of the drums being spaced from the conveyer by a distance less than the minimum thickness of the dough pieces handled by the apparatus, whereby the drums engage and pick up from the conveyer any dough sheets that are placed on the conveyer so improperly as to be brought into engagement with the drums by the conveyer, said pressure plates being so located as to be engaged by the dough pieces picked up by the drums whereby the drums roll such dough pieces along the plates for disposal.

5. The combination as set forth in claim 4 wherein the peripheries of the drums are roughened to facilitate picking up the dough sheets.

RUFUS P. STEADMAN.

REFERENCES CITED

The following references are of record in the file of this patent:

UNITED STATES PATENTS

| Number | Name | Date |
|---|---|---|
| 971,884 | Gowdy | Oct. 4, 1910 |
| 2,383,774 | Cohen et al. | Aug. 28, 1945 |
| 2,402,874 | Cohen et al. | June 25, 1946 |